Sept. 25, 1962 E. J. DIEBOLD 3,056,037

HIGH-POWER SEMI-CONDUCTOR RECTIFIER

Filed May 27, 1957

5 Sheets-Sheet 1

INVENTOR.
EDWARD J. DIEBOLD
BY
J. Gordon Angus
ATTY.

INVENTOR:
EDWARD J. DIEBOLD

By D. Gordon Angus
ATTY.

INVENTOR:
EDWARD J. DIEBOLD
By D. Gordon Angus
ATTY.

Sept. 25, 1962

E. J. DIEBOLD 3,056,037

HIGH-POWER SEMI-CONDUCTOR RECTIFIER

Filed May 27, 1957

5 Sheets-Sheet 4

INVENTOR:
EDWARD J. DIEBOLD

By J. Gordon Angus
ATTY.

Sept. 25, 1962 E. J. DIEBOLD 3,056,037

HIGH-POWER SEMI-CONDUCTOR RECTIFIER

Filed May 27, 1957

5 Sheets-Sheet 5

INVENTOR.
EDWARD J. DIEBOLD
BY
D. Gordon Angus
ATTORNEY

United States Patent Office
3,056,037
Patented Sept. 25, 1962

3,056,037

HIGH-POWER SEMI-CONDUCTOR RECTIFIER

Edward J. Diebold, Palos Verdes Estates, Calif., assignor to International Rectifier Corporation, El Segundo, Calif., a corporation of California Filed May 27, 1957, Ser. No. 661,871
2 Claims. (Cl. 307—58)

This invention relates to electrical rectifier systems and more particularly to such systems having parallel arranged rectifier branches.

An object of the invention is to cause each of the parallel connected rectifier branches to carry its proper share of the load current.

A related object is to provide a current transformer of a design suitable for creating a correct division of current through parallel connected rectifier branches.

It has been known to connect individual rectifier elements in series for the purpose of obtaining greater voltage withstanding ability across the series arrangement than can be provided by a single rectifier element; and it has also been known to connect rectifier elements, or strings of series connected rectifier elements, in parallel for the purpose of increasing the amount of current which can be handled by the rectifier system. A difficulty heretofore encountered in the use of rectifier systems having parallel arranged rectifier branches has been that due to normal irregularities or tolerances encountered in practice, one branch will carry more than its proportionate share of the load current. Such inequality or disparity of currents flowing through the parallel branches tends to become aggravated in use with the result that one or more of the branches may take so much of the load as to overload it and cause break-downs of rectifier elements.

In accordance with the present invention, provision is made for causing the respective parallel branches of a rectifier system to carry its proper or proportionate share of the load. Ordinarily, each parallel branch will be made the same as the other so that it will then be desired that each parallel branch shall carry the same amount current. This desired result is accomplished in accordance with the present invention by sending the current to be delivered to each of the parallel branches, through a current transformer. A current transformer has the property of establishing a substantially definite current flow through its secondary winding in relation to that through its primary winding. Thus, the current flowing to each of the parallel rectifier branches is established by the current transformer rather than by resistance or impedance characteristics of the rectifier elements or other circuit elements.

In the use of such a system, if the current should tend to rise in one branch beyond its allotted value in proportion to the current flowing through the other branches, the action of its current transformer is to oppose this rise of current and thus maintain the current at substantially its allotted value.

The use of the current transformers can be made to provide for established unequal division of current through the parallel branches if desired.

A feature of the invention resides in the construction of current transformers for the purpose of the circuitry involved.

The foregoing and other features of the invention will be better understood from the following detailed description and the accompanying drawings, of which:

Figure 12:
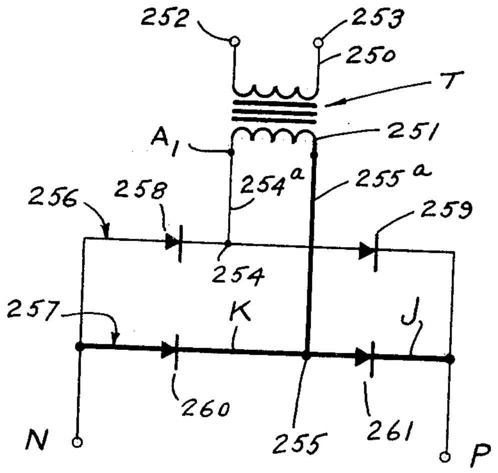
FIGS. 12 and 13 show circuits in which this invention may be utilized.
Figure 13:
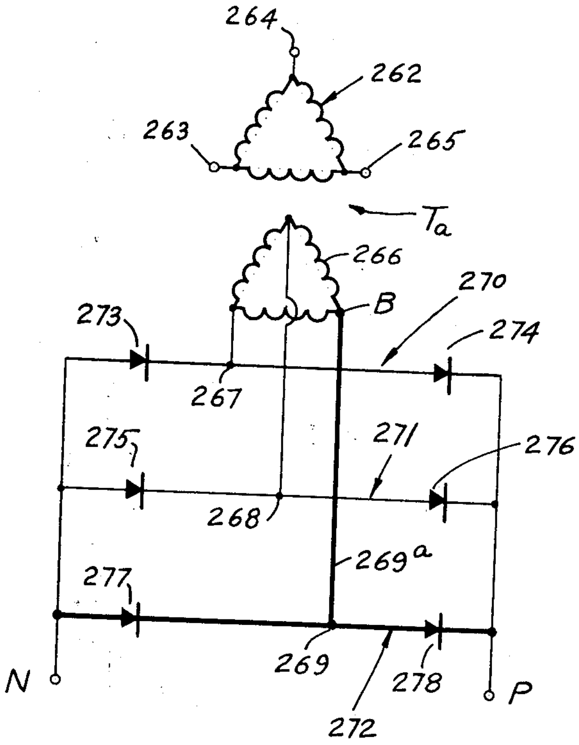

To illustrate the application of the present invention, reference is first made to FIGS. 12 and 13 which show commonly used bridge rectifier circuits, each having a single rectifying element in each arm of the bridge; FIG. 12 being a single-phase bridge, and FIG. 13 a three-phase bridge.

Referring to FIG. 12 there is shown a transformer T having a primary winding 250 and a secondary winding 251. Power is supplied in the usual manner at a pair of input terminals 252 and 253 across the primary winding, and the terminals of the secondary are connected at opposite terminals 254 and 255 of a rectifier bridge by leads 254*a* and 255*a*, respectively. This being a single-phase system there are two bridge legs 256 and 257, the leg 256 containing rectifier elements 258 and 259 and the leg 257 containing rectifier elements 260 and 261. Each of the rectifier elements 258, 259, 260 and 261 constitutes an arm of the bridge of which the input terminals are the terminals 254 and 255 and the output terminals are the terminals N and P across which there is developed the unidirectional output voltage of the bridge in accordance with well-known rectifying action.

In FIG. 13, the system is analogous to that of FIG. 12 except that FIG. 13 is arranged for three-phase operation. The three-phase transformer T*a* is shown with delta connected primary windings 262 having the three power input terminals 263, 264 and 265; and the secondary winding 266 is shown also delta connected with the three output terminals 267, 268 and 269 constituting the input terminals of the three-phase bridge. It will be understood, of course, that the transformer T*a* could be connected in some other way, such as star-connected if desired. Since the system is three-phase the rectifier bridge has three legs 270, 271 and 272, each leg having two rectifier elements. Leg 270 has the two rectifier elements 273 and 274, leg 271 has rectifying elements 275 and 276 and leg 272 has rectifier elements 277 and 278. In this arrangement each rectifying element constitutes an arm of the bridge. The D.C. output voltage of the bridge is taken at output terminals N and P as in the case of FIG. 12.

It will be recognized that other multi-phase arrangements could be used instead of that shown in FIG. 13, in which case the number of bridge legs will be established according to the number of phases. In FIGS. 12 and 13, each leg is shown as having two bridge arms in series. For example, the leg 256 of FIG. 12 contains the two arms composed of rectifier elements 258 and 259, respectively.

Each rectifier leg has been shown with a pair of arms, these arms including only a single rectifier. It is often desirable to carry greater currents and voltages in a leg of the type shown in FIGS. 12 and 13 than can be accommodated by a pair of rectifiers connected as shown. For that reason, it is desirable to be able to replace the legs shown having only individual rectifiers with a leg having a network including a plurality of rectifiers in parallel for a greater current capacity, and a plurality of rectifiers in series for greater voltage capacity.

Thus, leg 257 in FIG. 12, and leg 272 in FIG. 13 are shown in relatively heavy line. These legs are composed of circuitry between points A, N and P in FIG. 12, and between points B, N and P in FIG. 13. This invention provides circuitry by means of which the various arms can be enabled to carry a greater current and voltage than could be carried by the single rectifiers shown in FIGS. 12 and 13.

Figure 1:
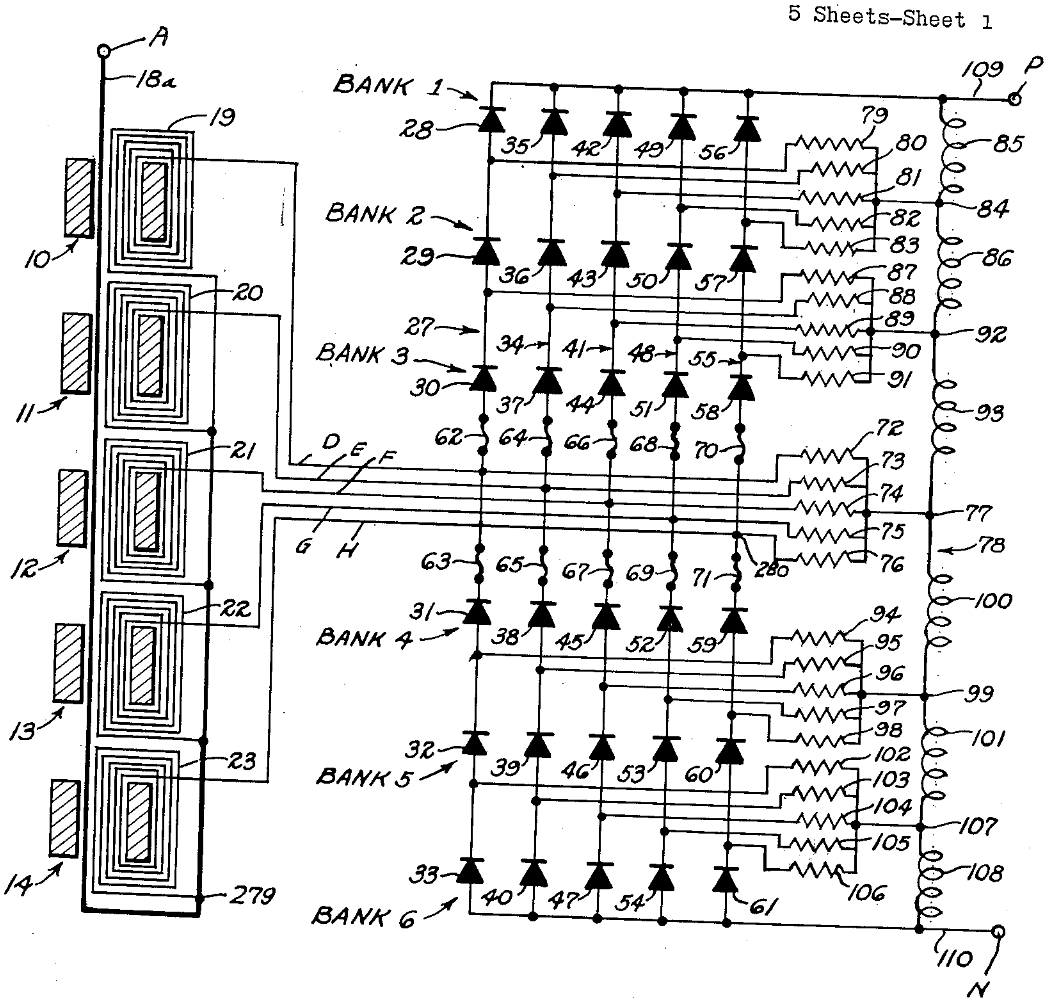
FIGS. 1–4 are schematic drawings showing various circuit means for forcing equal currents through branches of a parallel circuit.

Referring to FIG. 1, the circuitry therein represents an improvement according to this invention in the form of a leg which can be substituted for any of the legs of FIGS. 12 and 13. Thus, the terminals A, N and P of FIG. 1 correspond to the terminals A, N and P of FIG. 12. Likewise, terminals N and P of FIG. 1 correspond respectively to terminals N and P of FIG. 13, and terminal A of FIG. 1 corresponds to terminal B of FIG. 13. From what has been described it will be recognized that the circuitry of FIG. 1 can in the same way be substituted for the circuitry of any of the other legs of FIGS. 12 or 13; and it is contemplated that such will be the case. For the purpose of simplicity of illustration, only one leg is illustrated in FIG. 1; and the leg 257 from FIG. 12 has been arbitrarily selected for the purpose.

Referring now to FIG. 1, the rectifier leg illustrated therein has terminals N and P, and comprises a number of parallel circuit branches (D, E, F, G, H) connected between terminal A and terminals N and P. Five such parallel branches are illustrated, although it will be understood that some other number of parallel branches could be used instead if desired. The purpose of using parallel branches in a leg of a rectifier circuit is, of course, to permit an increased current flow through the rectifier to the load which will be connected across terminals N and P. In FIG. 1 each branch is shown as having a number of individual rectifier elements in series, the purpose of which is, of course, to increase the overall voltage which each leg or arm of the rectifier can withstand. In itself, the use of series and parallel-arranged rectifying elements to increase current carrying capacity or voltage ability is not new. Any number of series or parallel-arranged rectifier elements may be used in this manner.

A difficulty encountered in the use of parallel-arranged branches containing rectifier elements has been that there is a tendency for one branch to carry more current than another. This is due to the fact that it is not practical to keep the resistance across each branch the same as the resistance across every other branch in the parallel arrangement, so that a branch having the lowest resistance tends to carry the most current. This situation tends to aggravate itself with continued use with the result that an undue increase of current through one branch tends to produce break-downs of individual rectifier elements.

In accordance with the improvement incorporated in the arrangement of FIG. 1, this tendency toward unequal currents in the parallel branches is overcome and the current throughout the branches is maintained substantially equal. This is carried out by the arrangement of current transformers shown in the figure. Five current transformers 10, 11, 12, 13 and 14 are used for the purpose, the number of current transformers being equal to the number of parallel rectifier branches. The primary winding of each current transformer comprises a single turn and the secondary winding of each transformer comprises five turns, this five to one turns ratio corresponding to the five rectifier branches shown in the figure. All five of these current transformers are similarly constructed and the primary winding for all of them is the single lead **18*a* from point A, which will correspond to the lead 255*a* of FIG. 12. The secondaries of the respective transformers are the windings 19, 20, 21, 22 and 23. Each secondary winding has one of its terminals connected to the primary winding or lead 18*a* and its other terminal connected to a respective one of the branches, so that the secondaries are included in the respective branches. Thus, one secondary terminal 279 of current transformer 14 is connected to lead 18*a* while its other terminal 280 is connected with the branch lead marked H which connects to the midpoint of one of the legs of the rectifier system. In the same way, each of the other current transformer secondaries has one of its terminals connected to primary conductor 18*a*** and its other terminal to a respective one of the five branch leads which connect with midpoints of respective legs of the rectifier system.

Figure 9:
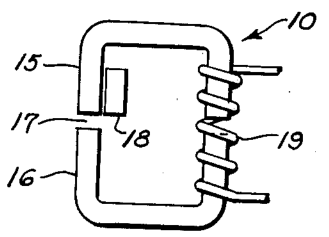
FIG. 9 is an end view showing the electrical and magnetic components of one of the current transformers of FIG. 1.

The construction of one of these current transformers is shown in detail in FIG. 9 which shows a current transformer 10 having a pair of U-shaped core pieces 15, 16 and with their abutting legs opposed and spaced from each other by about .005 inch to create an iron core with a pair of air gaps 17 to reduce the probability of saturation of the core. The primary winding 18 comprises a single turn, provided simply by the passage of conductor **18*a*** (of FIG. 1) through the center opening of the core.

FIG. 1 shows a means for causing an equal division of current through five branches of a leg, the branches being connected in parallel. Five current transformers 10, 11, 12, 13 and 14 are provided for this purpose. As will be observed in FIG. 1, the primary windings of all of the transformers are connected in series, and comprises a continuation of terminal lead **18*a*** which in the specification and claims may be referred to as a conductor means. The entire current thereby passes through the primary winding of each of the transformers.

The secondary winding 19 of each of the current transformers has, in this case, five turns. According to the presently preferred embodiment of the invention shown in FIG. 1 the ratio of the secondary turns to primary turns is equal to the number of circuit branches to be connected in parallel. In FIG. 1, the turn ratio is five, there being five branches, each branch including a string of rectifiers, each of which string is meant to carry an equal current from the primary lead 18.

Secondary windings 20, 21, 22 and 23, each also having five turns, are formed on the cores of current transformers 11, 12, 13 and 14 respectively. All five secondary windings are connected to the terminal lead **18*a*** after it has passed through all of the current transformers to form a primary winding for each. The entire load has thereby passed through all five primary windings in series. Each of the primary and secondary windings is so disposed and arranged that the fluxes which they create are opposed to each other in their respective cores.

Each of the secondary windings is connected to the mid-point of one string of rectifiers. Rectifier string 27 comprises rectifiers 28–33. String 34 comprises rectifiers 35–40. String 41 comprises rectifiers 42–47. String 48 comprises rectifiers 49–54. String 55 comprises rectifiers 56–61. Strings 27, 34, 41, 48 and 55 respectively have fuses 62, 63; 64, 65; 66, 67; 68, 69; 70, 71 connected one on each side of the midpoint of the respective strings, whereby a fuse is on each side of the connection of the secondary windings to their respective rectifier strings. Each of these strings comprises six rectifiers, which may be of the dry plate type. The rectifiers are connected in series with their forward directions of current flow oriented in the same direction, for one type of full-wave rectification.

Secondary windings 19, 20, 21, 22 and 23 are respectively connected to rectifier strings 27, 34, 41, 48 and 55. It will be observed that each branch of the circuit includes one secondary winding and one string of rectifiers.

Secondary windings 19–23 are also respectively connected to resistors 72–76. Each of resistors 72–76 is further connected to a point 77 in line 78. Resistors 72–76 all have the same resistance.

Resistors 79–83, which all have the same resistance, are all connected to a point 84 lying between two windings 85 and 86 in line 78 which are herein called indicator windings as they are useful for creating an indication of circuit conditions as is described hereinafter. The said resistors 79–83 are individually connected between rectifiers 28 and 29, 35 and 36, 42 and 43, 49 and 50, and 56 and 57, respectively.

Resistors 87–91, which all have the same resistance, are all connected to a point 92 in line 78 between indicator windings 86 and 93. Resistors 87–91 are connected between rectifiers 29 and 30, 36 and 37, 43 and 44, 50 and 51, and 57 and 58, respectively.

Resistors 94–98, which all have the same resistance, are all connected to a point 99 in line 78 between indicator windings 100 and 101. The resistors 94–98 are individually connected between rectifiers 31 and 32, 38 and 39, 45 and 46, 52 and 53, and 59 and 60, respectively.

Resistors 102–106 which all have the same resistance, are connected to a point 107 in line 78 between indicator windings 101 and 103. Resistors 102–106 are individually connected between rectifiers 32 and 33, 39 and 40, 46 and 47, 53 and 54 and 60 and 61, respectively.

Terminal lead 109 is connected across all of the strings at their "forward" end, terminating in terminal P. Terminal lead 110 is connected across all of the strings at their "rear" ends, terminating in terminal N. Line 78 is connected across terminal leads 109 and 110.

Windings 85, 86 and 93 are oriented so that their flux would tend to move a core (not shown) in an upward direction in FIG. 1. Relay windings 100, 101 and 103 are oriented so that their flux would tend to move a core (not shown) in a downward direction. Together with this core which may be common to all windings, they make up a relay which is balanced when the currents through all windings are equal, and which is unbalanced when any are unequal.

From the foregoing discussion it will be understood that the term "leg" denotes a system according to FIG. 1 comprising the transformer and rectifier elements between terminals A, N and P. The term "branch" denotes any of the circuits from the point of connection of a secondary with the primary conductor means 18a to a terminal N or P or to both terminals N and P. A rectifier "string" denotes a series of rectifier elements between terminals N and P. The term "arm" denotes any of the rectifier bridge arms shown in FIGS. 12 and 13. The group of series and parallel arranged rectifier elements at either side of the five lead lines marked D, E, F, G, H in FIG. 1 correspond to an arm of FIGS. 12 or 13.

Figure 2:
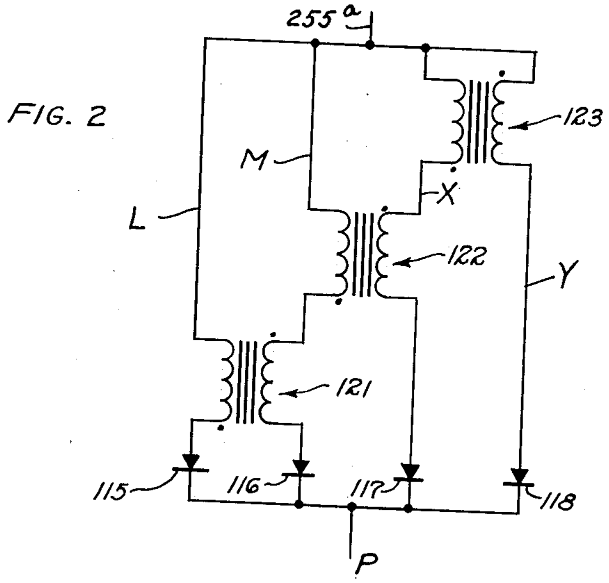

In FIG. 2 there is shown an arm useful in place of any arm of FIGS. 12 and 13, such as arm J of FIG. 12, for example. FIG. 2 illustrates an arm (two of which would be used for full-wave rectification, and one of which would be used for half-wave rectification). This arm may conveniently be connected to lead 255a in FIG. 12 in place of arm J. Another could be substituted for arm K of FIG. 12. This arm includes branches L, M, X and Y, which incorporate rectifiers 115–118, respectively. A current transformer 121 has one of its windings in series connection with rectifier 115 and the other of its windings in series connection with rectifier 116. A current transformer 122 has one of its windings in series with rectifier 116 and one winding of transformer 121, and the other of its windings in series connection with rectifier 117. A third current transformer 123 has one of its windings in series connection with rectifier 117 and one winding of transformer 122, and the other of its windings in series connection with rectifier 118.

Figure 5:
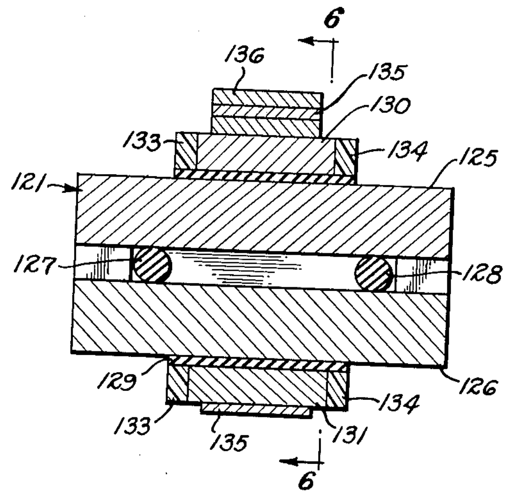
FIG. 5 is a cross-section taken at line 5—5 of FIG. 6, showing a preferred embodiment of a current transformer for use with the circuits of FIGS. 2–4.
Figure 6:
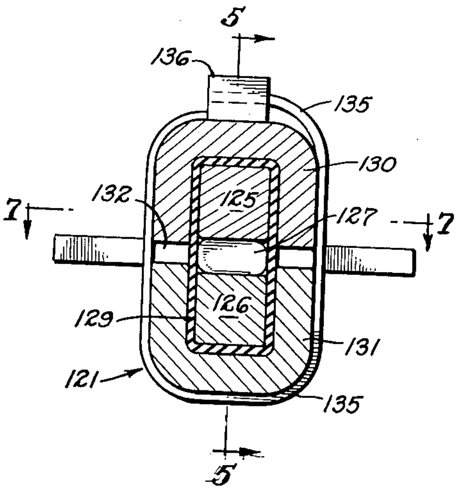
FIG. 6 is a cross-section taken at line 6—6 of FIG. 5.

Current transformer 121 is typical of the other current transformers 122 and 123, and will be described in detail. The ratio of its windings is 1:1. This current generator transformer 121 is provided with two one-turn windings. Inasmuch as the ratio is 1:1, it is unimportant which is taken as the primary and which is taken as the secondary. Because they each comprise only a single turn, it is allowable for the two conductors to simply pass directly through a window in an iron core. As shown in FIG. 5, a first winding 125 is separated from a second winding 126 by a pair of insulating spacers 127, 128. These two windings are held against the spacers by a wrapping 129 of insulation which may be tape or any other desired insulating material. A pair of U-shaped core members 130, 131 (see FIG. 6) are placed over the windings so that the legs of the U-shaped members face toward each other and leave an air gap 132 therebetween. This gap will ordinarily be of the order of .005 inch in width, its size being exaggerated in the drawings for purpose of illustration. Ceramic insulating washers 133 and 134 (see FIG. 5) are placed on each side of the core so as to further insulate the core from contact with windings. A strap 135 is wrapped around the core pieces and is bound with a buckle 136 to hold the core firmly on the windings.

Figure 7:
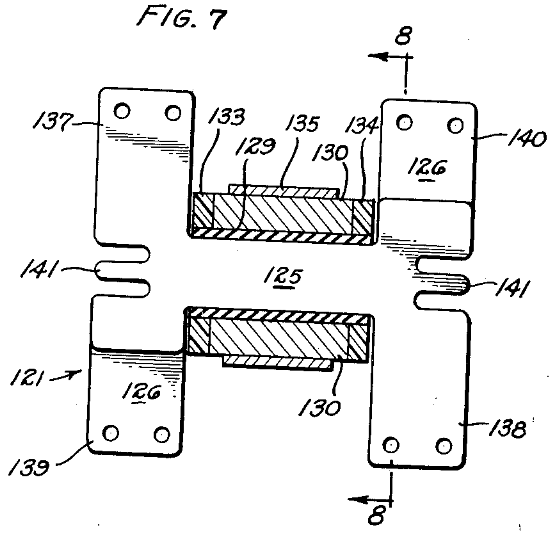
FIG. 7 is a cross-section taken at line 7—7 of FIG. 6.
Figure 8:
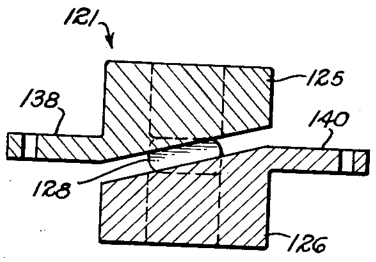
FIG. 8 is a cross-section taken at line 8—8 of FIG. 7.

As best shown in FIGS. 7 and 8, the windings comprise copper castings which have a central section that is closely surrounded by the core and insulation as shown in FIGS. 5 and 7. These windings are enlarged at each end. Winding 125 has terminal lugs 137 and 138 at oposite ends thereof, and winding 126 has lugs 139 and 140 at its opposite ends. As best shown in FIG. 7, the ends of the windings are cast with fins 141, which provide an enlarged area for heat dissipation. This construction of current transformer for a 1:1 ratio is inexpensive of manufacture and is sufficiently accurate for use in paralleling the circuits disclosed herein.

Figure 3:
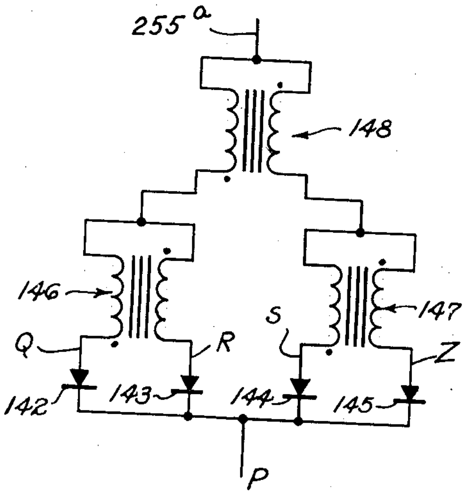

FIG. 3 shows an embodiment of the invention for paralleling four branches Q, R, S, and Z, each, containing a rectifier 142, 143, 144 and 145, respectively. The circuit of FIG. 3 may be used in the same manner as that of FIG. 2. Rectifiers 142 and 143 are each connected to a different winding of a 1:1 ratio current transformer 146 which will preferably be of the type shown in FIG. 5. Rectifiers 144 and 145 are each connected to a different winding of a similar current transformer 147. Both windings of current transformer 146 are connected to one winding of a similar current transformer 148. Both windings of transformer 147 are connected to the other winding of transformer 148. The windings of current transformer 148 are both connected to a lead such as lead 255a to form part of a leg.

Figure 4:
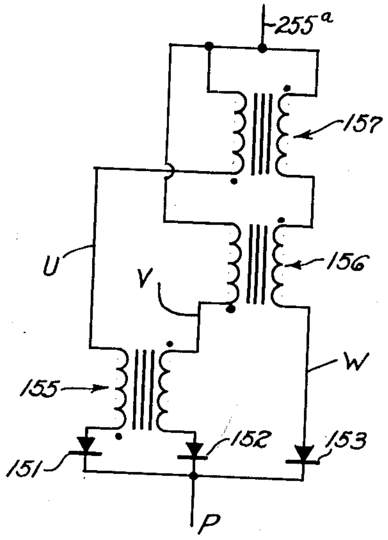

In FIG. 4 there is shown a system for utilizing 1:1 ratio current transformers of a type such as the transformer of FIG. 5 for the paralleling of three branches. The circuit of FIG. 4 may be used in the same manner as that of FIG. 2. In this circuit, branches U, V and W each contains a rectifier 151, 152 and 153, respectively. Rectifiers 151 and 152 are each connected to a different winding of a current transformer 155. Rectifiers 152 and 153 are each connected to a different winding of a current transformer 156. Rectifiers 151 and 153 are also connected in series to a different winding of another current transformer 157.

It will be observed that there are two transformer windings in series with each of the rectifiers. This does not materially increase the resistance of the system.

Figures 10, 11:
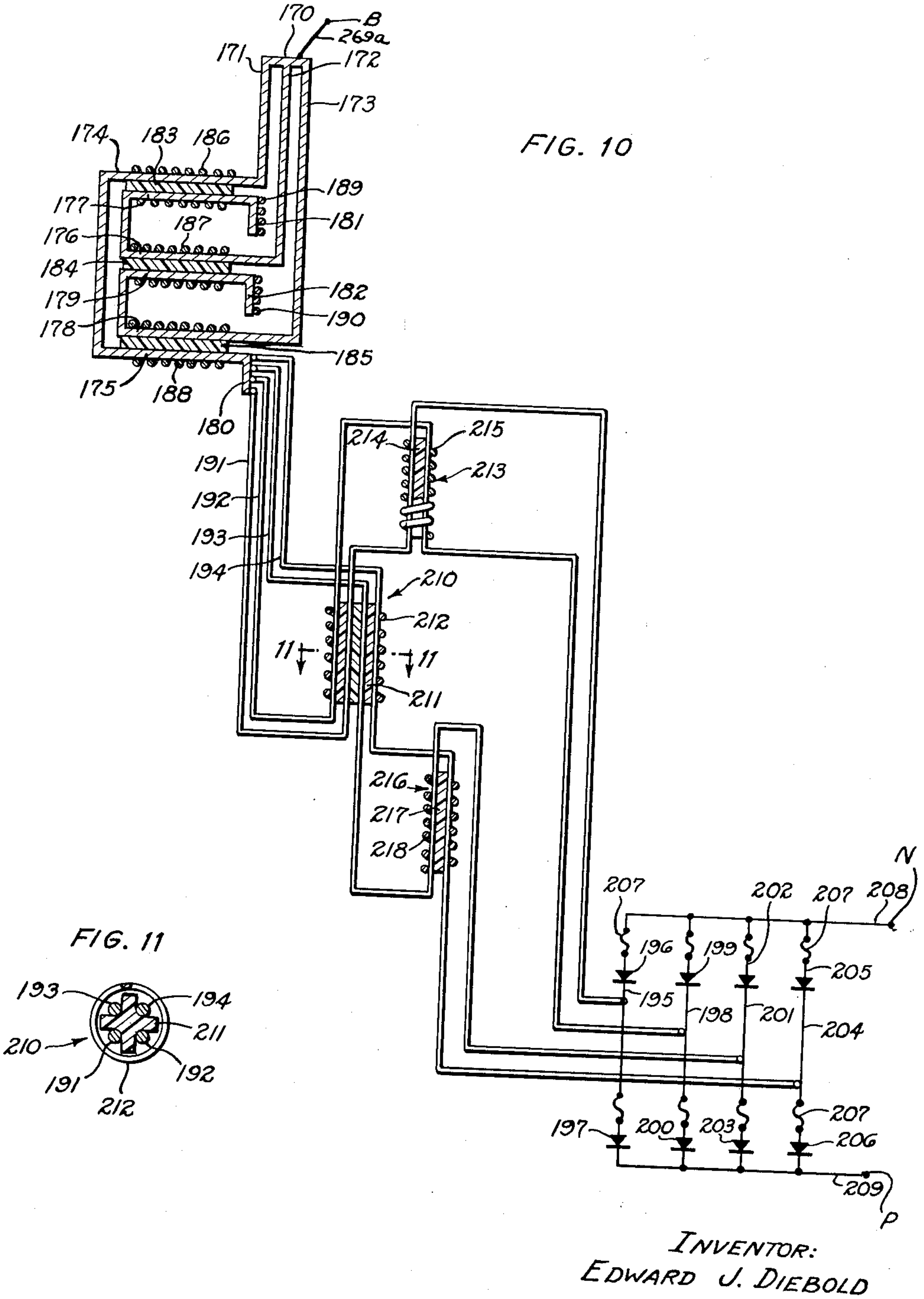
FIG. 10 is a view partly in cross-section and partly in schematic notation, showing another circuit according to the invention.
FIG. 11 is a cross-section taken at line 11—11 of FIG. 10.

In FIG. 10 there is shown still another circuit for dividing current among the branches of a leg. This circuit can conveniently be used as one leg of the delta-connected three phase system of FIG. 13. It is contemplated and intended that similar circuitry be provided for each one of the three legs. The circuit of FIG. 10 can be connected to terminal B by lead 269a, so that the terminal 170 corresponds to terminal B in FIG. 13.

Three bus bars 171, 172, 173 are connected to terminal 170 to receive the current of one phase. Each of these bus bars is bent into a substantial U-shape with a bight and a pair of reaches. Bus bar 173 has reaches 178 and 179.

Bus bar 171 has a terminal flange 180 on its free end, while bus bars 172 and 173 have similar flanges 181 and 182, respectively, on their free ends. As will be seen from the diagram, reaches 174 and 177 are parallel and opposed to each other, while reaches 176 and 179, and reaches 175 and 178 are similarly parallel and opposed to each other. Insulating members 183, 184 and 185 are respectively inserted between the corresponding parallel reaches so as to insulate the same from each other.

Each parallel reach attached to an insulating member forms, in effect, a single-turn winding of a current transformer, one being a "primary" and the other a "secondary" winding. A core for the said transformers might comprise a metal jacket of preformed hypersil magnetic material. As a less expensive expedient, a wrapping of annealed soft steel wire such as 188 is shown, size No. 18 being most convenient. A layer of this wire is wrapped around each pair of opposed reaches. The wire should be insulated or, if preferred, a layer of insulation can be laid between the legs and a wrapping of uninsulated wire can be wrapped on the insulation. A similar wrapping 186 of wire serves as a core for the current transformer which includes reaches 174 and 177. A similar wrapping 187 of wire serves as a core for the current transformer which includes reaches 176 and 179. As will be seen from an examination of the drawings, currents drawn through the three bus bars are opposed in the said pairs of parallel reaches in the individual transformers.

Four distribution leads 189, are attached to flange 181. Four distribution leads 190 are attached to flange 182, and four distribution leads 191, 192, 193 and 194 are attached to the flange 180. Inasmuch as the circuitry for the distribution leads 189 and 190 will be the same as that for the leads 191–194, the detailed circuit will be shown only for the latter, it being understood that similar circuitry is provided for each of the other two sets of distribution leads 189 and 190.

The distribution leads 191–194 eventually pass through four strings of rectifiers. An object is to divide the current equally among the strings connected to the same bus, and also to divide the current equally among the busses. Distribution lead 191 is connected to a string 195 comprising rectifiers 196 and 197, lead 191 being connected to the string between the two rectifiers.

Lead 192 connects to a string 198 comprised of rectifiers 199 and 200, the lead 192 being connected to the string between the two said rectifiers.

Lead 193 connects to a string 201 comprised of rectifiers 202 and 203, the lead 193 being connected to the string between the said two rectifiers.

Lead 194 connects to string 204 which string is comprised of rectifiers 205 and 206, the lead 194 connecting to the string between the two rectifiers.

A pair of fuses 207 is incorporated in each of said strings. One end of each of the strings is connected to a lead 208, that connects to a negative D.C. terminal N. The other end of the strings is connected to a lead 209, that connects to a positive D.C. terminal P. Terminals N and P can be common with similar terminals from circuitry connected to leads 181 and 182. Then twelve strings of rectifiers (in twelve circuit branches) will be accurately paralleled.

In addition to the current transformer means as shown in connection with bus bars 171, 172 and 173 for substantially equally dividing the current into the three groups of four leads each which are individually attached in groups to the flanges 180, 181 and 182, additional current transformers are provided for equally dividing the current between the four strings in each group of rectifiers which is connected to an individual flange.

A first such current transformer 210 comprises leads 191 and 192 which run substantially parallel to each other, and leads 193 and 194 which are parallel to each other and also with leads 191 and 192. These leads are, in effect, the windings of a current transformer. The current in leads 193 and 194 flows in the opposite direction from the current in leads 191 and 192. As shown in FIG. 11, a cruciform-sectioned piece of insulation 211 separates the leads from each other so that they do not touch. A core for this current transformer might conveniently be a jacket of a magnetic material such as hypersil. A less expensive core comprises a wrapping of about 150 turns of No. 18 size soft steel wire, wrapped tightly around the outside of the leads and insulator. This wire wrapping is shown at 212. It will be seen that the flux created by the current in leads 191 and 192 will be opposed to the flux created by the current in leads 193 and 194, because the directions of current flow are opposite.

Another current transformer 213 is comprised of leads 191 and 192 which are separated from each other by insulation 214. The leads act as transformer windings. The directions of current flow through the leads 191 and 192 in this current transformer are opposite from each other. The bundle consisting of these two leads and the insulation is tightly wrapped with a wrapping 215 of about 150 turns of soft steel wire to form a core.

Still another current transformer 216 is comprised of leads 193 and 194 whose directions of current flow are opposite to each other. Insulation 217 separates these leads. The leads act as transformer windings. A wrapping 218 of about 150 turns of soft steel wire is wrapped around the bundle consisting of the two wires and the insulation to form a core for the current transformers. Thereafter, the leads 191–194 are attached to the respective strings of rectifiers as heretofore described.

It will be recognized that in current transformers 210, 213 and 216, the distribution leads act as primary and secondary windings, their ratio being 1:1, and the wrappings of wire act as magnetic cores. In the current transformers made up of the reaches of the bus bars, the reaches act as primary and secondary windings, and the wrappings of wire act as magnetic cores. Since the ratio of these transformers is 1:1, the terms "primary" and "secondary" have no particular pertinence.

The operation of the circuit shown in FIG. 1 will now be described. The entire primary current from terminal A passes through the primary winding *18a* of each one of the current transformers 10–14 inclusive. This current sets up a flux in the core of each transformer that is proportional to the number of primary amperes times the number of primary turns (the number of turns being one, in this case). After passing through the primary windings, the current divides and passes into the five parallel branches.

If the current transformers were not provided, the current would divide equally into the five branches only if the inductive and resistive voltage drop across each branch from terminal A to terminals N and P are equal. This is an unlikely situation even if the rectifiers are carefully selected and matched. There are too many other variables, such as the inductive effects of surrounding structures. In addition, the characteristics of even very carefully matched rectifiers will change and vary from each other as the result of such factors as aging, temperature effects, voltage applied, and load carried. Furthermore, careful matching creates a series replacement problem in the event of failure of one rectifier cell. Even rectifiers which were once carefully matched might not always serve as suitable replacements because of the changes resulting from aging and other effects. In addition, the temperature within a large rectifier installation may vary from rectifier to rectifier, so that carefully matched rectifiers no longer have exactly the same characteristics in operation. The results of all this is that, in actual operation, a current unbalance between circuit branches usually tends to become, worse and worse over a period of time, until finally some rectifier burns out.

Matching of rectifiers to provide proper paralleling operation on the basis of thereby securing equal voltage drops in each branch is therefore not a suitable solution. The system shown in the invention is for providing a correct current division in the branches irrespective of the equality of characteristics of the rectifiers (within operating limits, of course). This system operates on the basis of the inherent property of a current transformer to maintain a constant ratio between the current in its primary winding and the current in its secondary winding. In this system, the actual voltage drop in each rectifier is of little or no concern in the forward direction of current flow. It is the current carried which is controlled. It will of course be recognized that, as in any system which relies on the compensation effect of some device to provide more or less current, some slight inequalities may exist, but in operation these tend to average out to negligible values.

Assuming an initial equal division of current between branches D, E, F, G and H in FIG. 1, then the flux developed in each core by the secondary winding thereof will be substantially equal to the flux developed in each core by the primary winding. This is because, while the current in the secondaries will be only one fifth that of the primary, there are five times as many turns in each secondary as in the primary. The ampere-turns of primary and secondary are therefore equal. The windings and direction of current flow therethrough are so disposed and arranged in each transformer that, in accordance with familiar principles, the flux in the core caused by the primary is opposed to the flux in the core caused by the secondary. This arrangement is common to every current transformer in all of the figures. The opposed fluxes being equal, there will be no net flux in the core.

If, on the other hand, the inductive and resistive values of any of the branches beyond the current transformers is unequal to any of the others, then, in accordance with well-known principles, the branch with the lowest resistance would tend to carry a larger share of the load than the others in the absence of the current transformers. The current transformer prevents such a current imbalance.

In any branch of the circuit which tended to carry less than its proportional share of the load, the number of ampere turns on the secondary winding would be less than those on the primary winding, and a net flux would result in the core of the current transformer in this branch. This net flux would induce a voltage drop across the secondary winding, which would tend to force an additional increment of current through the secondary winding and through the rectifier string connected thereto. This increment would raise the amperage through the said secondary, and tend to restore the flux in the core to zero.

On the other hand, if one of the branches carried too little current, as above, some of the other branches would carry too much current. The secondary ampere turns would then exceed the primary ampere turns, and a net flux would arise tending to give rise to a counter electromotive force which would diminish the current through the secondary. The five current transformers thereby function to equalize the current passing through the circuit branches. It will be appreciated that the potential across the various strings of rectifiers may be different from each other, but that the current passed by each string will be equal. Of course, the potential drop over the total branches will be equal, but the potential drops across the secondary windings may be unequal, as may be the potential drops across the individual strings.

The potential difference needed to be supplied by the current transformers 10–14 is not large. This is because the potential drop through a rectifier in the forward direction is quite small. For example, in a 150 ampere capacity germanium rectifier, the forward potential drop is only approximately ½ volt, the rectifier element thereby having an ohmic resistance of only approximately 0.003 ohm. Only a small difference in potential across any of the secondary windings will make a sufficiently large change in current flowing therethrough to balance a current inequality in the branches.

In addition, to dividing the current equally among the strings in the direction of forward flow, it is also desirable to secure an equal division of voltage across the individual rectifiers during the periods of reverse flow. It is to be remembered that rectifiers have an extremely low forward resistance, and a much higher reverse resistance.

The rectifiers are arranged in banks. Bank 1 consists of rectifiers 28, 35, 42, 49 and 57. Bank 2 consists of rectifiers 29, 36, 40, 50 and 57. Bank 3 consists of rectifiers 30, 37, 44, 51 and 58. Bank 4 consists of rectifiers 31, 38, 45, 52 and 59. Bank 5 consists of rectifiers 32, 39, 46, 53 and 60. Bank 6 consists of rectifiers 33, 40, 47, 54 and 61.

The individual rectifiers of each bank are maintained at the same potential as the other elements in the same bank during the reverse flow. This is provided for by means of the line 78. It will be observed that the semi-conductor rectifier elements of bank 1 undergo in the reverse direction of flow, an equal voltage drop, because they are all connected through equal resistors to terminal lead 109 and point 84 in line 78. The same consideration is true for bank No. 2, the elements of which are connected in parallel across points 84 and 92 on line 78. Similarly, the rectifiers of bank 3 are connected in parallel across points 92 and 77; rectifiers of bank 4 are connected in parallel across points 77 and 99; rectifiers of bank 5 are connected in parallel across points 99 and 107; and the rectifiers of bank 6 are connected in parallel across point 107 and terminal lead 110. Therefore the voltage drops of all of the rectifiers in each individual bank are equal, and it follows that there is a balanced distribution of voltage drops in each string.

It may occur that one of the rectifiers, say rectifier 38, becomes faulty for some reason. It may, for example, have broken down so that it has a low resistance in the reverse direction and thereby permits a high reverse flow of current. Using rectifier element 38 as an example, it will be seen that so far as bank 4 is concerned, the voltage drop across all five rectifiers is always equal because of the parallel connection between points 77 and 99. However, in the event rectifier 38 breaks down, a larger current will flow through rectifier 38 than through the other rectifiers in bank 4. Also bank 4 can draw a higher current than the other banks because of the low back resistance of rectifier 38. This means that a larger current is drawn through point 99, and also thereby through indicator winding 100, than would be drawn if all five rectifiers in bank 4 were working properly. This larger current will be drawn while a diminished current is drawn in the other banks and their associated indicator windings 85, 86, 93, 101 and 108. This causes the windings to create a net flux, which can be utilized to actuate a device such as a relay to start an alarm or other annunciator device (not shown) for disclosing the faulty operation of the rectifier assembly. Such a relay could conveniently comprise an electromechanical device using a magnetizable core (not shown) movable by flux generated in indicator windings 85, 86, 93, 100, 101 and 108.

For rectifying large currents, many rectifier units such as that shown in FIG. 1 may be put into parallel operation. Usually it will then be preferable to have them operate at different phase angles in order to provide a large number of phases in the D.C. output. It is also possible to place more or fewer strings of rectifiers in parallel by changing the ratio of the current transformers. Also, more or fewer rectifiers can be put into a single string. If several rectifier units such as FIG. 1 are put in parallel operation their forward impedances will be very nearly equal, and further efforts to obtain correct parallel operation between them are usually unnecessary.

The resistors such as 79, 80, 82 and 83 and other similar resistors ordinarily have a moderate resistance value, for instance, 100 to 500 ohms. The actual resistance values will be determined from case to case. It should lie somewhere between the resistance of the rectifying elements in the forward direction of current flow, which is quite low, and its resistance in the backward direction of current flow, which is much larger, often of the order of 10 times the resistance in forward flow.

In the devices of FIGS. 2, 3 and 4, whose operation is now to be described, the flux caused by the primary and secondary windings are opposed in the cores. Dots are provided at the ends of the windings to show the direction of flux caused by that winding.

It will be further understood that while the branches in FIGS. 2–4 are each shown with only one rectifier, it is possible to place more than one rectifier in series connection in each of said branches.

In FIG. 2, the current flows from lead 255*a* into the branches L, M, N and P. Without current transformers, the current would divide equally into the said branches only if the inductive and resistive values of each branch were equal to the said values in all of the other branches. The current transformer forces an equal current division, even if said values tend to be unequal. Current transformer 121 will have no net flux if the currents in branches L and M are equal. Any inequality of current will cause a net flux in the core of the current transformer which would induce voltage drops in the two windings of transformer 121 which would restore an equal division of current between the two branches L and M in the manner described in connection with FIG. 1. However, in FIGS. 2, 3 and 4, equal current division is caused by an equal current flow in primary and secondary, while in FIG. 1, the current in the secondary was a predetermined portion of the primary current (the reciprocal of the number of branches, and of the turns ratio). The operation is the same, however, the current transformers seeking to restore a condition of no net flux in the core on account of an equal number of ampere-turns from the primary and from the secondary windings. An equal division between branches M and N, and between branches N and P, is caused by current transformer 122 and 123, respectively.

In FIG. 3, current from lead 255*a* divides to flow through both windings of current transformer 148. This provides an initial equality between the sum of currents in branches Q and R and branches S and T. The two windings of current transformer 148 are respectively connected to the two windings of current transformers 146 and 147 which respectively divide the loads between their windings. The current drawn through branches Q, R, S and T are thereby rendered substantially equal.

The operation of the embodiment shown in FIG. 4 is substantially the same as those aforementioned, wherein the current transformer 155 directly divides the current between branches U and V, while the current transformer 156 directly divides the current between branches V and W. Current transformer 157 directly divides the current flow between branches U and W. It will be noted that in this circuit, two current transformer windings are series-connected in each branch.

The operation of the embodiment of FIG. 10 may be deduced from the drawings. In order for current to proceed from terminal 170 to the rectifier strings it must first pass through the bus bars 171, 172 and 173 to reach the flanges 180, 181 and 182. This provides for an initial division of current into the principal branches. With respect to current flowing through the buses 171 and 172 it will be observed that inequality between the current flowing through reaches 174 and 177 will result in a net flux in the core 186 which will create voltage drops in the buses and raise or lower the current passing therethrough so as to equalize said currents.

The same considerations hold true for buses 172 and 173 whose reaches 176 and 179 form the windings of another current transformer. Inequality of current flowing through these two buses will similarly create a flux in core 187 which creates voltage drops in the buses which will cause more or less current to be drawn from the terminal 170 thereby equalizing the flow between these two buses.

Similar considerations hold for equalization of current between buses 171 and 173, their reaches 175 and 178 also being opposed so that inequality of current flow therethrough causes a flux to be generated in the core 188, thereby causing voltage drops in the buses to equalize the currents drawn therethrough.

It will thereby be seen that each of the three buses 171, 172 and 173 is in essence coupled to each of the others in a manner which will equalize the division of current therebetween. It may be that the potential at each of the flanges will be somewhat different on account of the aforesaid voltage drops (which may be positive or negative in sense), but the current passing through each of the flanges will be substantially equal.

However, mere equality of current flowing into each of the principal branches is not ordinarily sufficient to assure the correct parallel operation of a large number of high current rectifiers, and for this purpose the current transformers 210, 213 and 216 are provided. The operation of these current transformers is similar to that of the current transformers used on the buses 171, 172 and 173.

With reference to transformers 210, it will be seen that the flux induced in the core 212 by leads 191 and 192, is directly opposed to the flux induced by the leads 193 and 194. Therefore, so long as the total current in leads 191, 192 is substantially equal to the total current in leads 193, 194, there will be no net flux. However, should there be an inequality between these two totals, then a potential difference will be induced in the leads at this point which will cause the current to increase or decrease in the leads until the flux is reduced again to zero.

Inasmuch as the current transformer 210 merely assures that the sum of the currents in leads 191 and 192 will equal the sum of the currents in leads 193 and 194, leads 191 and 192 are led to the current transformer 213 in which the directions of current flow in these two leads are opposed. If there is an inequality of current between leads 191 and 192, a flux will arise in the core 215 which will induce a voltage drop in one or both of said leads so as to equalize the current therethrough. The same consideration applies with respect to leads 193 and 194 as they pass through the current transformer 216 so that their currents are equalized. It will be seen that after the leads 191–194 have passed through the current transformers 210, 213 and 216, they will each carry an equal portion of the current from flange 180. The leads, in this case, act as windings. Each winding has but one turn, so that the term "primary" or "secondary" could be applied to either.

It will also be appreciated that although the currents passing through each of the strings of rectifiers are equal, the potential across each individual rectifier may not be equal, inasmuch as there may be a potential difference in the circuit between the bus 180 and the terminal leads 208 and 209 occasioned by the current transformer, which potential differences may or may not be equal in each case. However, it has been found that potential differences of only a few tenths of a volt are ordinarily sufficient to take care of a current imbalance of magnitudes which are ordinarily encountered in operation.

This invention provides a convenient means whereby rectifiers, and in particular dry-plate rectifiers, can be used in parallel connection without the necessity of attempting to match their forward and backward voltage drops. It has been found that such matching is almost a hopeless matter, even when a large amount of time and expenses are expended because these properties vary not only with the temperature, but also with the load and the age of the individual rectifier.

In fact, troubles with matching rectifiers have been so severe that rectification of high currents with parallel dry plate rectifier assemblies has been almost impossible in many large installations, even when the greatest care has been made in selecting the individual components. Furthermore, the necessity of keeping a carefully selected and matched group of rectifiers for replacement has been a matter of great difficulty. In many cases, parallel operation in high current rectifiers has simply been foregone rather in the face of such difficulties.

This invention, however, provides a cheap current transformer suitable for use in balancing the current between the various branches of a parallel circuit. This means of creating correct parallel operation is substantially independent of the properties of the individual rectifiers. At the most, only a coarse matching which is well within the tolerances of routinely required production testing is all that is needed.

While circuits have been disclosed which equally divide the current between branches, it will be recognized that it may be desired to divide the current in some other ratio. In that case, which is still within the scope of this invention, it is only necessary to adjust the turns-ratio of the current transformers accordingly, bearing in mind that a zero-net flux in the core of the current transformer is to be achieved when the current is properly divided.

In such an event, the ratio of secondary turns to primary turns would be approximately adjusted. For example, suppose it were decided to divide current into four paths, with three paths carrying 20% (0.20) of the current, and one carrying 40% (0.40) of the current. Then letting Y equal the percentage, expressed as a decimal, of the total current carried by the least loaded branch (0.20), and X equal the factor by which another branch is to exceed this percentage (2 for one branch, 1 for the others), the turn ratio will be XY, X perhaps having a different value, always greater than 1, for each branch. Thus XY for the branch carrying ⅖ of the load will be (2) (.2), and for the branches carrying ⅕ of the load it will be (1) (.2). A convenient winding design would then be 5 secondary and 2 primary turns for the 40% branch, and 5 secondary and 1 primary turn for the 20% branches. Other systems can easily be designed from this criterion.

Circuits other than those shown could be conceived by persons skilled in the art, and still utilize these means of causing correct parallel operation. Therefore this invention is not to be limited by the device shown in the drawings and described in the description, which are given by way of example and not of limitation, but only in accordance with the scope of the appended claims.

I claim:

1. In an electrical circuit having a plurality of strings of rectifiers, each of said strings comprising a plurality of series-connected rectifiers, the rectifiers of said strings being arranged in banks, whereby a rectifier of each string lies in one bank only, means for equalizing the voltage across the rectifiers in each bank in the reverse direction of current flow through the rectifiers comprising a conductive line comprising distributed impedance interconnecting the opposite ends of each string of rectifiers, and a plurality of groups of resistors equal in number to the strings, each group comprising a plurality of resistors each having a terminal connected to a respective individual point of said line and the remaining terminals of the resistors of the group being connected respectively to different strings at a position between pairs of adjacent banks, each group having one less resistor than there are banks, said distributed impedance comprising indicator windings serially connected in said line, there being one indicator winding between each pair of adjacent points.

2. Apparatus according to claim 1 in which the number of indicator windings equals the number of banks, the flux generated by one half of said indicator windings being opposite to that generated by the other half whereby a means controlled by said indicator windings are in equilibrium when current through said indicator windings is substantially equalized.

References Cited in the file of this patent

UNITED STATES PATENTS

| | | |
|---|---|---|
| 499,852 | Pfannkuche | June 20, 1893 |
| 1,098,664 | Dobrowolsky | June 2, 1914 |
| 1,110,550 | Hewitt | Sept. 15, 1914 |
| 1,270,805 | Fortesque | July 2, 1918 |
| 2,224,755 | Werner | Dec. 10, 1940 |
| 2,403,637 | Christie | July 9, 1946 |
| 2,700,129 | Guanella | Jan. 18, 1955 |
| 2,760,142 | Hitchcock | Aug. 21, 1956 |
| 2,779,927 | Rudge | Jan. 29, 1957 |
| 2,856,577 | Schmidt | Oct. 14, 1958 |
| 2,886,779 | Kuhrt et al. | May 12, 1959 |
| 2,891,212 | Bingham | June 16, 1959 |
| 2,908,855 | Hudson | Oct. 13, 1959 |
| 2,918,616 | Diebold | Dec. 22, 1959 |

FOREIGN PATENTS

| | | |
|---|---|---|
| 24,217 | Great Britain | Oct. 20, 1894 |
| 612,131 | France | Oct. 18, 1926 |